March 29, 1966  H. B. ELLIS  3,242,668
MEANS FOR REDUCING ROCKET MOTOR COMBUSTION CHAMBER INSTABILITY
Filed June 5, 1961  4 Sheets-Sheet 1

INVENTOR.
HERBERT B. ELLIS
BY
ATTORNEY

INVENTOR.
HERBERT B. ELLIS

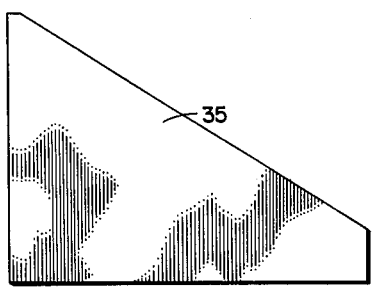  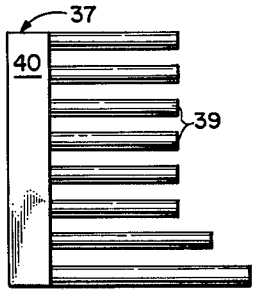 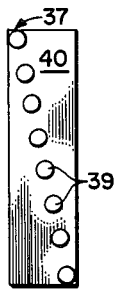
Fig.4  Fig.5  Fig.6  Fig.7
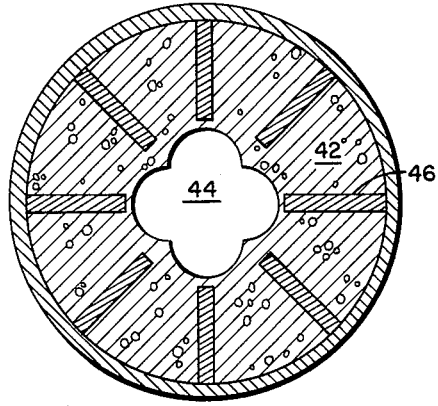 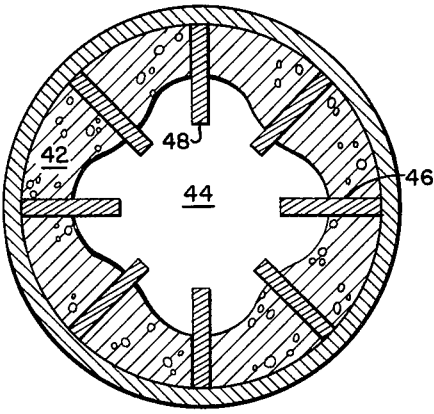
Fig.8  Fig.9
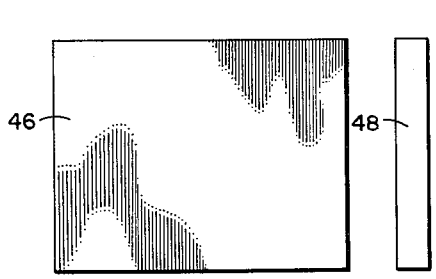 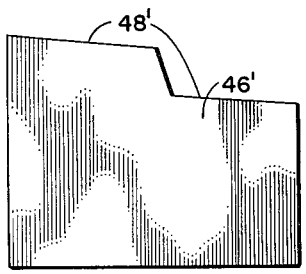 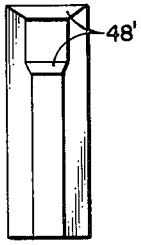
Fig.10  Fig.10a  Fig.11  Fig.11a
INVENTOR.
HERBERT B. ELLIS

INVENTOR.
HERBERT B. ELLIS

United States Patent Office 3,242,668
Patented Mar. 29, 1966

3,242,668
MEANS FOR REDUCING ROCKET MOTOR
COMBUSTION CHAMBER INSTABILITY
Herbert B. Ellis, Flintridge, Pasadena, Calif., assignor to
Aerojet-General Corporation, Azusa, Calif., a corporation of Ohio
Filed June 5, 1961, Ser. No. 116,237
10 Claims. (Cl. 60—35.6)

This invention relates generally to rocket motors and more particularly to a device for controlling combustion chamber instability in rocket motors.

Tangential combustion chamber instability in the combustion chamber of a rocket motor is characterized by the formation of one or more destructive shock waves which travel around the inner surface of the combustion chamber in a generally circular path, and at a high cyclic frequency. When it occurs, it can destroy the motor, and its elimination constitutes a major problem to the designer of rocket motors. There are many factors which influence the tendency of the rocket motor to become unstable, such as the size and shape of the combustion chamber, the length of the rocket motor housing, the propellants used, and in the case of liquid fuel rockets, the pattern of perforations in the injector plate.

In practice, external requirements often dictate the shape of the motor housing, the choice of propellants, etc., so that in the case of liquid fuel rockets, often the only freedom left to the rocket motor designer for the purpose of eliminating combustion chamber instability is the selection of an injector plate with a suitable pattern of perforations. Even here, however, various conditions often limit the freedom of the designer. For example, it may happen that the pattern of perforations in the injector plate which result in stable motor operation are poor in performance. In particular, the most suitable pattern of perforations in the injector plate from the standpoint of motor stability may be unsuitable from the standpoint of vaporizing the fuel or oxidizer, or may be unsuitable from the standpoint of properly mixing the fuel and oxidizer vapor in the combustion chamber. Conversely, the most suitable pattern of perforations in the injector plate from the standpoint of performance may result in a rocket motor which has a tendency to become unstable whenever relatively minor disturbances occur in the combustion chamber.

Another factor to be considered is that the tendency of the rocket motor toward combustion chamber instability may vary considerably between transient starting conditions and steady state operation. In practice, it has been found that the tendency toward combustion chamber instability is generally greatest during transient starting conditions.

What is needed, therefore, and among other things comprises an important object of this invention, is a device for preventing the occurrence of combustion chamber instability in a rocket motor.

The invention, in its broadest aspect, comprises a rocket motor provided with baffle plates mounted in the combustion chamber. These baffle plates decrease gaseous cross-velocities in the combustion chamber which are caused by cyclic pressure perturbations in the rocket motor. In this way, combustion chamber instability is decreased.

This and other objects of this invention will become more apparent when read in the light of the accompanying drawing and specification wherein:

FIG. 4 is a front elevational view of a typical baffle adapted to be mounted in the combustion chamber of a liquid fuel rocket motor;

FIG. 5 is a side elevational view of the baffle shown in FIG. 4;

FIG. 6 is a front elevational view of another baffle form adapted for use in the combustion chamber of a rocket motor;

FIG. 7 is a side elevational view of the baffle shown in FIG. 6;

FIG. 8 is a cross-sectional view of a solid fuel grain for a solid fuel or hybrid rocket motor, where the grain has baffles molded therein;

FIG. 9 is a cross-sectional view of the solid fuel grain shown in FIG. 8 after the motor has been operating for a while and has caused the core of the grain to increase in size until the ends of the baffles extend inside the hollow core;

FIG. 10 is a front elevational view of a baffle adapted to be molded in the grain of a solid fuel or hybrid rocket motor;

FIG. 10a is a side elevational view of the baffle shown in FIG. 10;

FIG. 11 is a front elevational view of a baffle with a different shape which could be molded in the grain of a solid fuel or hybrid rocket motor;

FIG. 11a is a side elevational view of a baffle shown in FIG. 11;

Figure 1:
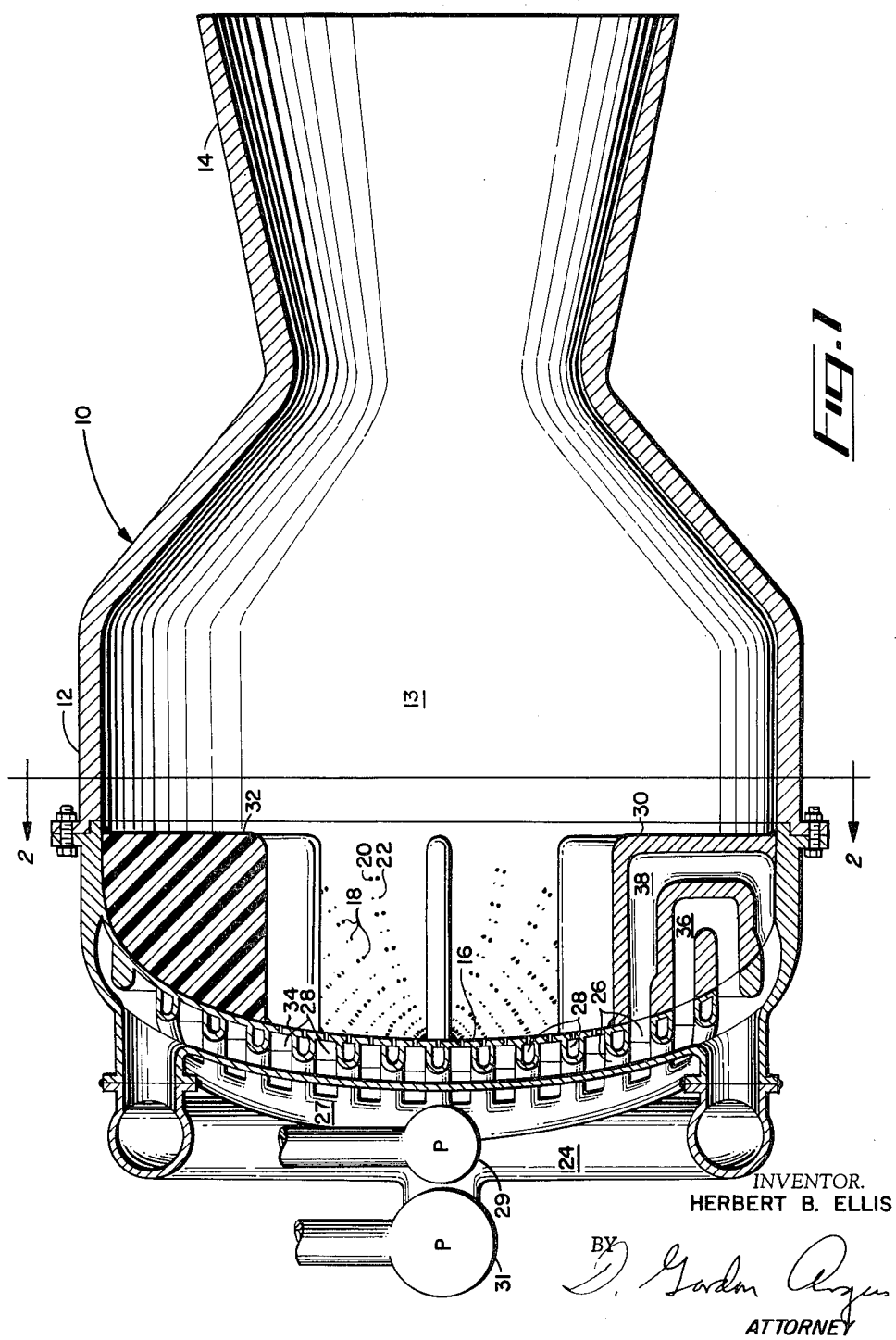
FIG. 1 is a side sectional view of a rocket motor constructed according to the principles of this invention.
Figure 2:
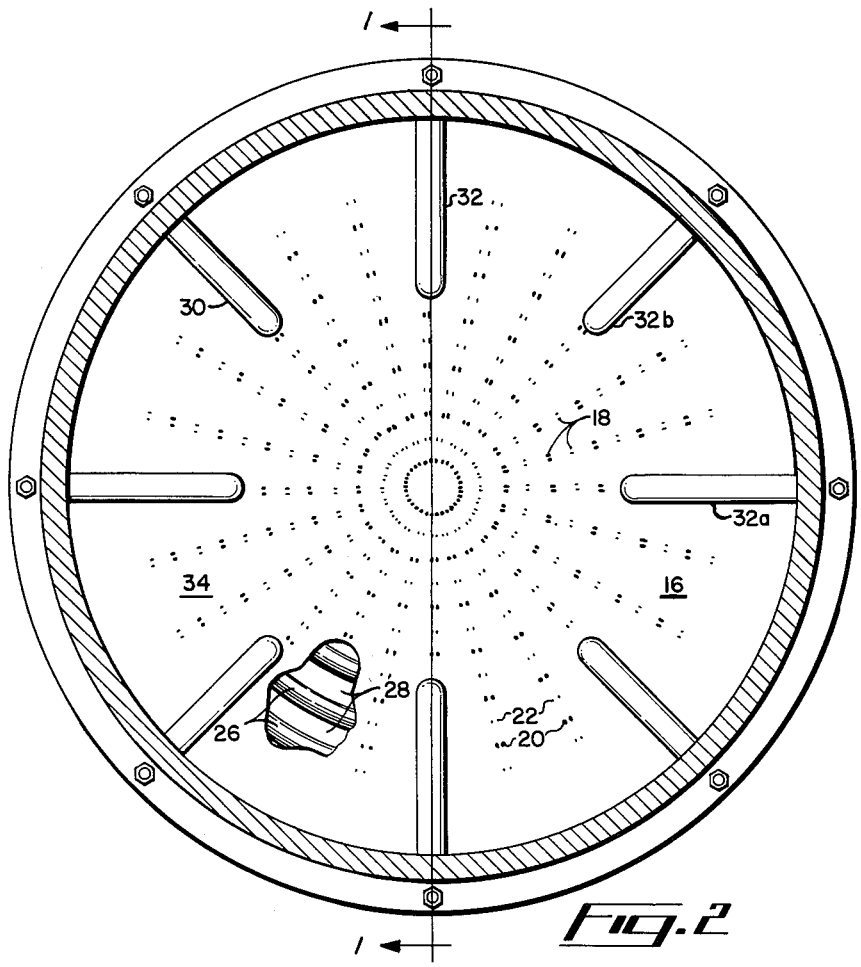
FIG. 2 is a sectional view taken on the line 2—2 of FIG. 1 with part of the surface of the injector plate broken away to show its internal structure.

Referring now to FIG. 1 of the drawing, a rocket motor indicated generally by the reference numeral 10 comprises a rocket motor housing 12 having a nozzle portion 14 at one end and a removably mounted injection plate or wall 16 at the other end. As best seen in FIG. 2, the injection plate or wall 16 is provided with a pattern of perforations extending therethrough. In this particular embodiment these perforations are disposed along generally radial lines 18 which are in uniform angularly spaced relation to each other. As shown in FIG. 2, these lines of perforations comprise alternate pairs of holes 20 and 22. Holes 20 are larger than holes 22 and serve as oxidizer injector holes, while holes 22 serve as fuel injector holes. In this particular embodiment, the corresponding holes in the various lines of perforations 18 are equidistant from the axis of the rocket motor housing.

As best seen in FIG. 1 a fuel manifold 24 is connected to a source of fuel. This manifold is connected to a plurality of concentric generally circular fuel passageways 26 formed in the body of the injection wall (see FIG. 2). In addition, an oxidizer manifold 27 is provided and this manifold is connected to a series of concentric generally circular oxidizer passageways 28. Passageways 26 and 28 are concentric with each other and are in alternately spaced relation from the axis of rocket motor 12. As shown in FIG. 2, holes 22 formed in the injector plate, communicate with circular passageways 26, while holes 20 formed in the injector plate communicate with oxidizer passageways 28. With this arrangement, when fuel and oxidizer are pumped through manifolds 24 and 27 by pumps 29 and 31, the fuel and oxidizer are sprayed into the combustion chamber 13 through holes 20 and 22. To this point, the structure for spraying fuel and oxidizer into the combustion chamber of the rocket motor is generally conventional.

In order for combustion chamber instability to occur, there must exist an unreacted media in the combustion chamber of the rocket motor that is capable of releasing its stored potential energy when a pressure perturbation passes through it. In other words, one requirement for instability is the presence of a sufficient quantity of unreacted fuel and oxidizer vapor. Since pressure perturbations occur frequently in the combustion chamber even during normal combustion, tangential combustion chamber instability occurs when the amount of energy released by a cyclic pressure perturbation is equal to or greater than the amount of energy consumed by the circulation of the shock wave as it rotates about the combustion chamber. If conditions are such that less energy is released during a cycle of pressure perturbation, the original perturbation strength will be diminished during successive cycles and will eventually attenuate. Consequently, if the energy released by the cyclic movement of the pressure perturbation can be artifically decreased to a level below the amount of energy required to maintain a cyclic perturbation, the rocket motor will not become unstable.

As stated above, in order for a cyclic tangential high frequency front to continue in the thrust chamber, a sufficient concentration of fuel and oxidizer must be physically mixed and heated so they will be ready to release enough chemical energy during the next passage of the pressure front to provide the amount of energy needed to support the front. Under normal combustion distribution patterns, the time necessary to effect this mixing and heating is usually much longer than the time of a front excursion around the combustion chamber periphery. However, when cross velocities of the combustion gas occur in the combustion chamber due to cyclic pressure perturbations they speed up the mixing, heating, and vaporizing of the injected fuel and oxidizer. The faster the velocity of this gas across the face of the injector, the more rapid can be the pre-combustion processes.

In the embodiment shown, as best in FIG. 2, baffles 30 and 32 are provided. These baffles are disposed adjacent the injector plate 16 so they extend generally perpendicularly out therefrom. The baffles are also in generally uniformly spaced relation to each other. With this arrangement, the cross-flow pattern of the combustion gases is altered. In particular, in the region adjacent to each baffle, both ahead and behind, a high gaseous cross-velocity is no longer possible. In addition, in the midpoint between the baffles, the gas velocity is reduced. The degree of reduction is generally related to the height that the baffles extend from the injector plate and their distance apart. This arrangement alters the pattern of the cross-flow of combustion gas which has been generated by the previous front. By slowing the cross gas flow, the amount of newly injected fuel and oxidizer that is mixed and is ready to react in the front is reduced. This in turn causes a weaker front to be generated, since the amount of available energy has been reduced. The result is that the cyclic pressure perturbations rapidly weaken or are damped out.

Another benefit resulting from this arrangement is that the major force of the combustion gas cross-velocity is moved further away from the injector plate so that the injector plate is less affected by the high gas temperatures. In addition, the volume of the mixing has been increased, permitting a greater amount of normal flame front combustion reaction to occur. This also causes a reduction of the amount of chemical energy that is available for release by the pressure perturbation, thus further stabilizing the motor.

It is apparent that the number of baffles required and their size is dependent upon the intensity of the cyclic pressure perturbations in the particular rocket motor and the speed of the cross gas velocities. As stated above, a cyclic pressure perturbation releases energy from the unreacted fuel and oxidizer spray. The concentration of this unreacted fuel and oxidizer spray increases from surface 34 on the face of the injector plate to a maximum at some point downstream of the injector wall. Thereafter, as the fuel and oxidizer react with each other, this concentration of unreacted material steadily decreases to a minimum. Consequently, the axial length of the baffles should preferably be sufficient to reach the region in the rocket motor housing where the concentration of unreacted fuel and oxidizer spray is generally at a maximum. If this is done, the energy released by a pressure perturbation in the rich concentration of unreacted fuel and oxidizer spray will be insufficient to maintain the cyclic movement.

Because of the high temperature in the combustion chamber of the rocket motor, it is apparent that the baffles will quickly deteriorate unless means are provided for cooling them. In the particular embodiment shown, there are two classes of baffles. Baffles 30 are cooled as described below, and baffles 32 are uncooled. It is to be understood, however, as will become more apparent below, that the requirements of the motor determine whether or not all or only some of the baffles should be cooled.

As best seen in FIG. 1, each of the cooled baffles 30 are provided with passageways 36 and 38 extending therethrough. One end of each of these passageways communicates with the fuel manifold 24 and the other end of each of these passageways is connected to certain of the circular fuel passages 26 formed in the body of the injector wall 16. With this arrangement, some of the fuel pumped through the manifold 24 is first circulated through baffles 30 before it enters the circular passageways 26 from where it is sprayed into the combustion chamber 13 through perforations 22. This arrangement enables baffles 30 to endure the high temperature inside of the combustion chamber of the rocket motor until the fuel supply is exhausted.

As best seen in FIG. 1 the rocket motor is also provided with non-cooled baffles 32 in this particular embodiment. These baffles may be formed from a material such as glass cloth stiffened by a suitable epoxy or resin. These non-cooled baffles are designed so the high temperature inside the combusion chamber of the rocket motor will cause them to disintegrate for reason to be described below. When the baffles disintegrate, particles may strike the inner walls of the rocket motor housing and damage it unless the baffle material is carefully chosen. The composition of baffles 32 is determined by composition of the rocket motor housing. In particular, if the rocket motor housing is formed from aluminum, for example, and the baffles are formed from a stiffened glass cloth, as described above, the impact of tiny particles of the disintegrating baffle on the walls of the housing will not cause any damage. Alternately, the baffles could be formed from aluminum and the rocket motor casing from stainless steel, or the baffles could be formed from comparatively soft magnesium and the rocket motor casing from fiberglass.

Figure 3:
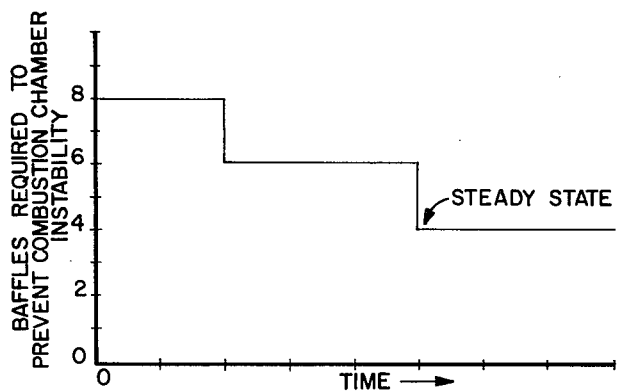
FIG. 3 is a diagram showing the decreasing requirements for baffling in a particular rocket motor as the motor approaches a steady operating condition.

As the diagram shown in FIG. 3 indicates, the tendency of a rocket motor to become unstable is generally greatest during start-up and decreases to zero or to some minimum level when the motor arrives at a steady state condition. By way of example, the instability characteristics of the rocket motor disclosed in FIG. 1 are such that a certain number of baffles (8 has been arbitrarily selected) must be present when the motor starts up, to overcome the initially high but transient sensitivity to tangential combustion chamber instability (see FIG. 3). As time goes on, the diagram indicates that the sensitivity to tangential combusion chamber instability decreases so that less baffling is required (the number 6 has been arbitrarily selected). Finally, when the motor arrives at a steady state operating condition, usually within a second after startup, the number of baffles required may decrease further either to zero or to some minimum value (in this particular embodiment, the number 4 has been arbitrarily selected).

From the above description, it can be seen that the number of baffles required to prevent tangential combustion chamber instability during transient starting conditions may be in excess of the number of baffles required when the motor has arrived at a steady operating condition. Since weight is a critically important factor in a rocket motor, it would be desirable to automatically dispose of the excess baffles as the need for them decreases. For that reason, in this particular embodiment, the baffles have been divided into two groups, the cooled baffles 30 and the non-cooled baffles 32.

With this arrangement, during startup the eight baffles present will be sufficient to prevent tangential combustion chamber instability during the transient starting conditions. Since baffles 32 are not cooled, they will quickly deteriorate because of the heat in the combustion chamber, but they are made large enough so they will last through the critical transient starting period which may be as long as one second. Typical dimensions for the baffles shown in FIG. 1, for example, would be 4–5 inches in axial length, 4–5 inches in width, and ¼ inch in thickness. After the critical starting period has passed, the non-cooled baffles 32 will automatically disintegrate and will be injected through the nozzle 14 of the rocket motor.

In the diagram shown in FIG. 3, for purposes of illustration, the need for baffling has been shown to decrease from eight baffles initially to six baffles at some intermediate time and to four baffles during a steady state operation. This means that the four baffles required for steady state operation will have to be cooled, as shown in FIG. 2. For optimum weight conditions, it may be desirable for only two of the non-cooled baffles to deteriorate at the intermediate period when only six baffles are required. Then, when steady state operating conditions arrive, the remaining two non-cooled baffles should deteriorate. This can be achieved by designing two of the non-cooled baffles; i.e., baffles 32a; so they are larger and have more resistance to heat than the remaining two baffles; i.e., baffles 32b. With this arrangement, all eight baffles will be present during the transient starting position. Then the smaller baffles 32b will automatically deteriorate and will be ejected through the nozzle of the motor at a time when the motor has become more stable. Finally, when the motor has arrived at a steady state operating condition, the heat in the combustion chamber will cause baffles 32a to automatically disintegrate. Consequently, the number of baffles present in the rocket motor will automatically correspond to the baffling requirements of the rocket motor.

It is apparent that in some rockets, instability problems occur only during transient starting conditions, and once the motor has started, it becomes completely stable. In such a case, none of the baffles would be cooled, and after the motor has started up and arrived at a steady state operating condition, all baffles would disintegrate and be ejected through the nozzle of the motor. On the other hand, some motors may have a tendency to instability even after the motor has arrived at a steady state operating condition. In such an event, all baffles may have to be cooled.

It is apparent that the shape of the baffles is also a factor in determining their resistance to heat decomposition and their effectiveness in controlling instability. The generally triangular baffle 35 shown in FIGS. 4 and 5 is characteristic in shape and its dimensions typically range from 4 to 5 inches in length, 4 to 5 inches in width, and ¼ of an inch in thickness. Baffle 37 shown in FIGS. 6 and 7 represents a departure from the usual baffle shape in that it consists of a plurality of rods 39 mounted in a support plate 40. The dimensions of these rods are typically ⅜ inch in diameter and 4 to 5 inches in length.

In the example described above, the principles of this invention have been applied to a bi-propellant rocket. It is apparent, however, that the principles of this invention can also be applied to a mono-propellant rocket, and the claims should be so construed.

The principles of this invention can also be applied to solid fuel or hybrid rockets. Combustion chamber instability is also a problem with such rockets because the volume of the hollow core of the solid fuel grain which serves as the combustion chamber increases during operation of the motor in a manner well known in the art. The continuously increasing size of the hollow core or combustion chamber of the solid fuel grain can cause the rocket motor to pass through a region of combustion chamber instability where cyclic pressure perturbations and high gaseous cross-velocities can destroy the motor.

To prevent this, a generally cylindrically solid fuel grain 42, formed from a combustible material and having a conventional hollow core 44, star shaped in cross section, is provided with a plurality of suitably formed baffles 46 molded into the grain (see FIG. 8). In the example disclosed, the baffles are disposed in uniformly angularly spaced relation around the axis of the grain, but this is not an essential condition. In addition, the length of the baffles shown in the drawing is insufficient initially to reach into the hollow core 44, but depending on the stability needs of the motor, the baffles could have any length.

The size of these baffles is such that during operation of the motor, when the hollow core increases in size to a point where combustion chamber instability begins to appear, the end portions 48 of the baffles protrude into the hollow core or combustion chamber 44 and function in the manner described in connection with liquid fuel rockets to reduce or eliminate combustion chamber instability (see FIG. 9). Another important advantage obtained through the use of these baffles is that they strengthen the fuel grain. Consequently, very large size fuel grains can be manufactured because the baffles help the grain to resist deformation due to their weight. In addition, the large fuel grains can be better connected in a segmented configuration. This permits large high thrust solid fuel rockets to be made.

As stated above, the baffles can have any shape in accordance with the needs of the motor. For example, they could be formed from a suitable plate material and be generally rectangular in shape, as shown in FIGS. 10 and 10a. This would produce a straight end portion 48. Alternatively, the baffles could be shaped like the baffles 46' in FIGS. 11 and 11a with an irregularly shaped end portion 48' to provide a close automatic correspondence between the effectivness of the baffles and an irregularly varying sensitivity to combustion chamber instability in the motor.

Since the sensitivity of the solid fuel grain toward combustion chamber instability may vary irregularly while the grain is burning, it is possible that after the hollow core of the grain has increased to a predetermined size, the motor has passed from its region of instability back to its region of greater stability. If such is the case, the end portion 48' of the baffle shown in FIG. 11a could be a thinned stem portion, or could be formed from a material which disintegrates readily when heated. In this way, when the size of the hollow core increases to where the thin stem portion projects therein, the heat will disintegrate it so that the unnecessary baffles are automatically ejected from the motor.

Figure 12:
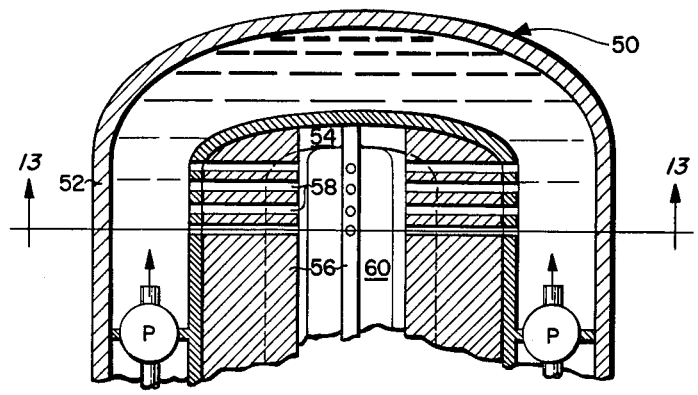
FIG. 12 is a sectional view taken on line 12—12 of FIG. 13.
Figure 13:
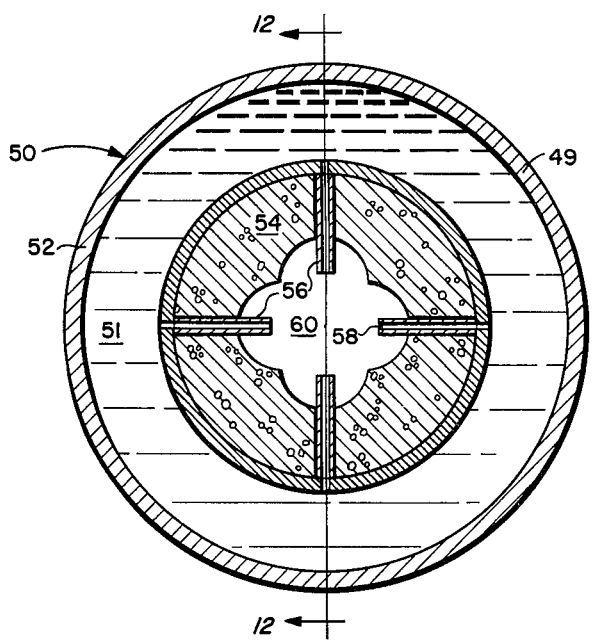
FIG. 13 is a sectional view taken on the line 13—13 of FIG. 12.

The principles of this invention are applicable to hybrid rockets as shown in FIGS. 12 and 13. There, a hybrid rocket indicated generally by the reference numeral 50 comprises a liquid oxidizer and a solid fuel grain in a manner well known in the art. The liquid oxidizer 51 may be stored in a tank 52 concentric with the grain 54. Baffles 56 may be molded in the grain as described above. In this case, however, it may be desirable to prevent the baffles from disintegrating, due to the high temperatures in the core of the grain. If cooling should be necessary, the baffles 56 may be provided with passages 58 communicating with the liquid oxidizer tank 52 and the core 60 of the fuel grain. With this arrangement, pump means (not shown) may be used to pump the liquid oxidizer through the passages 58 into the hollow core 60 of the solid fuel grain, as shown in FIGS. 11 and 12. In this way, the cooled baffles will not disintegrate, so that the tendency of the hybrid rocket to become unstable can be eliminated. In addition, the baffles have the additional function of serving as fuel injectors.

It is obvious that many modifications of the present invention are permissible in the light of the above teachings. It is, therefore, to be understood that the invention may be practiced other than as described and still remain within the scope of the appended claims.

I claim:

1. A rocket motor having a varying sensitivity to combustion chamber instability comprising a motor housing having a nozzle portion at one end, a combustion chamber in the rocket motor housing, a plurality of baffles mounted in said combustion chamber for decreasing the speed of gaseous cross-velocities due to cyclic pressure perturbations in the combustion chamber to prevent combustion chamber instability, and said baffles having varying disintegration rates with respect to the high temperatures in said combustion chamber whereby said baffles disintegrate at a predetermined rate and in accordance with the decreasing sensitivity of the rocket motor to combustion chamber instability.

2. A rocket motor having a transient sensitivity to tangential combustion chamber instability during motor start-up comprising a motor housing having a nozzle portion at one end, an injection plate at the other end, and a combustion chamber therebetween, said injection plate having a pattern of perforations extending therethrough, some of said perforations communicating with a fuel source, other of said perforations communicating with an oxidizer source whereby fuel and oxidizer may be sprayed through said perforations into said combustion chamber, and a plurality of baffles mounted in fixed relation to said injection plate for decreasing the speed of gaseous cross velocities by the injection plate due to cyclic pressure perturbations in the combustion chamber during motor startup to prevent combustion chamber instability, and at least one of said plurality of baffles being disintegrateable because of the heat in the combustion chamber after a selected period of motor operation so as to be ejected through the nozzle portion of the rocket motor whereby the weight of the rocket motor is decreased.

3. The rocket motor described in claim 2 wherein said baffles are generally triangular in shape.

4. The rocket motor described in claim 2 wherein said baffles are generally triangular in shape and with a length dimension ranging from 4 to 5 inches, a width dimension ranging from 4 to 5 inches and a thickness dimension in the neighborhood of 1/4 inch.

5. The rocket motor described in claim 3 wherein said baffles are formed from stiffened glass cloth.

6. The rocket motor described in claim 3 wherein said baffles are formed from aluminum.

7. The rocket motor described in claim 2 wherein said baffles comprise a series of elongated rods mounted on a support plate.

8. The rocket motor described in claim 2 wherein said baffles comprise a series of elongated rods mounted on a support plate, said rods being 3/8 inch in diameter and 4 to 5 inches in length.

9. A rocket motor sensitive to combustion chamber instability comprising a motor housing having a nozzle portion at one end, an injection plate at the other end, and a combustion chamber therebetween, some of said perforations communicating with a liquid fuel source, other of said perforations communicating with a liquid oxidizer source whereby liquid fuel and oxidizer may be sprayed through said perforations into said combustion chamber, and a plurality of baffles mounted in fixed relation to said injection plate for decreasing the speed of gaseous cross-velocities by the injection plate due to cyclic pressure perturbations in the combustion chamber to prevent combustion chamber instability, at least some of the baffles being provided with passages extending therethrough, one end of the said passages communicating with one of said liquid sources and the other end of the said passages communicating with some of the perforations in the injection plate whereby said baffles having passages therethrough are cooled by the circulation of a liquid therethrough and are thereby prevented from deteriorating due to the high temperatures in the combustion chamber.

10. A rocket motor having a high degree of sensitivity to combustion chamber instability during motor start-up and lesser degrees of sensitivity to combustion chamber instability during subsequent periods of rocket motor operation comprising a motor housing having a nozzle portion at one end, an injection plate at the other end, and a combustion chamber therebetween, said injection plate having a pattern of perforations extending therethrough, some of said perforations communicating with a fuel source, other of said perforations communicating with an oxidizer source whereby fuel and oxidizer may be sprayed through said perforations into said combustion chamber, and a plurality of baffles mounted in fixed relation to said injection plate for decreasing the speed of gaseous cross-velocities by the injection plate due to cyclic pressure perturbations in the combustion chamber to prevent combustion chamber instability, some of the baffles being provided with passages extending therethrough, one end of said passages communicating with a fuel source and the other end of said passages communicating with some of the perforations in the injection plate, means for forcing fuel through said passages so that the circulation of fuel through the baffles cools the baffles and prevents them from deteriorating due to the high temperatures in the combustion chamber whereby the speed of gaseous cross-velocities by the injection plate due to cyclic pressure perturbations in the combustion chamber never rises above a predetermined level, and other baffles which are not cooled by the circulation of fuel therethrough having dimensions and a mass such that the said other baffles disintegrate because of the heat in the combustion chamber at selected periods of motor operation and after the sensitivity of the motor combustion chamber instability falls to such a level that the said other baffles are in excess of the needs of the motor whereby the weight of the motor is minimized.

References Cited by the Examiner

UNITED STATES PATENTS

| | | | |
|---|---|---|---|
| 2,807,931 | 10/1957 | Bodine | 60—35.6 |
| 2,919,550 | 1/1960 | Kaskan et al. | 60—39.72 |
| 2,927,423 | 3/1960 | Wisniowski | 60—35.6 |
| 2,929,208 | 3/1960 | Schultz | 60—35.6 |
| 2,936,585 | 5/1960 | Worsham et al. | 60—39.72 |
| 2,977,754 | 4/1961 | Bell | 60—35.6 |
| 2,987,883 | 6/1961 | Lawler | 60—35.6 |
| 3,041,836 | 7/1962 | Truman et al. | 60—35.6 |
| 3,077,073 | 2/1963 | Kuhrt | 60—35.6 |

MARK NEWMAN, *Primary Examiner.*

SAMUEL FEINBERG, BENJAMIN A. BORCHELT,
*Examiners.*

V. R. PENDEGRASS, *Assistant Examiner.*